United States Patent [19]

Feasey et al.

[11] Patent Number: 5,130,053
[45] Date of Patent: Jul. 14, 1992

[54] STABILIZATION OF CONCENTRATED HYDROGEN PEROXIDE SOLUTIONS

[75] Inventors: Neil D. Feasey, Cheshire; Gareth W. Morris, Merseyside, both of England

[73] Assignee: Interox Chemicals Limited, London, England

[21] Appl. No.: 553,089

[22] Filed: Jul. 17, 1990

[30] Foreign Application Priority Data

Nov. 9, 1989 [GB] United Kingdom ............... 8925376

[51] Int. Cl.$^5$ ............................................. C01B 15/037
[52] U.S. Cl. ........................... 252/400.22; 252/186.29; 423/272; 423/273; 558/190
[58] Field of Search ............... 558/190; 423/273, 272; 252/400.22, 186.29

[56] References Cited

U.S. PATENT DOCUMENTS

| | | | |
|---|---|---|---|
| 3,387,939 | 6/1968 | Reiley | 423/272 |
| 3,701,825 | 10/1972 | Radimer | 423/273 |
| 3,740,187 | 6/1973 | Kowalski | 252/186 X |
| 3,903,244 | 9/1975 | Winkley | 423/272 |
| 4,059,678 | 11/1977 | Winkley | 423/273 |
| 4,155,738 | 5/1979 | Boghosian | 423/273 |
| 4,304,762 | 12/1981 | Leigh | 423/273 |
| 4,320,102 | 3/1982 | Dalton, Jr. et al. | 423/273 |
| 4,614,646 | 9/1986 | Christiansen | 423/273 |
| 4,725,281 | 2/1988 | Stehlin et al. | 252/186.29 X |
| 4,770,808 | 9/1988 | McDonogh et al. | 423/273 |

Primary Examiner—Deborah L. Kyle
Assistant Examiner—Valerie D. Fee
Attorney, Agent, or Firm—Larson and Taylor

[57] ABSTRACT

Concentrated solutions of hydrogen peroxide tend to decompose on storage, thereby losing their effectiveness, amongst other reasons by virtue of interaction with contaminating transition metals.

Peroxygen compounds are stabilized by contact with a stabilizing amount of compound of general formula:

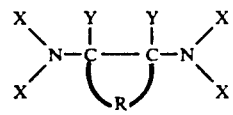

in which X represents a methylene phosphonic acid group of formula $-CH_2-(-PO_3H_2)$ or salt thereof, R represents a tetra methylene diradical, optionally alkyl-substituted, that completes a cyclo-aliphatic ring and thereby establishes the two $NX_2$ groups in a substantially fixed configuration and Y represents a hydrogen or lower alkyl group.

Preferably, the solutions contain additionally one or more co-stabilizers, including stannate, phosphates, hydroxybenzoic acid, citric acid and nitrate.

The stabilizer system can enable the solution to be diluted, even with municipal water.

10 Claims, No Drawings

STABILIZATION OF CONCENTRATED HYDROGEN PEROXIDE SOLUTIONS

The present invention relates to a process for stabilising concentrated solutions of hydrogen peroxide and in particular a process in which an ion-chelating stabiliser is incorporated therein.

Concentrated aqueous solutions of hydrogen peroxide suffer from the problem of decomposition during storage or use and there have been many suggestions given as to possible causes of the decomposition. These include the application of excess heat, exposure to various types of radiation and contact with various sorts of container surface, but one of the most widespread causes is contamination of the peroxidic solution with certain catalysts, often in solution or as solid particles in contact therewith. Such catalysts often are transition metals, of which the most prevalent are the first row metals such as iron, copper, vanadium, cobalt, chromium and nickel.

There have been many proposals for stabilising hydrogen peroxide solutions, by which herein is meant reducing the rate of decomposition of the peroxide. Hydrogen peroxide is normally transported and stored in the form of concentrated solutions so as to minimise the cost of transporting and storing more water than is necessary. The high concentration of the hydrogen peroxide, a widely used oxidant, and the likelihood that the solution may be stored for some considerable time before it is used imposes a particular set of requirements upon a process for stabilisation. In particular, the stabiliser is desirably effective under acidic conditions and is resistant to in situ oxidation, thereby retaining its effectiveness during prolonged storage. Secondly, since it is often desirable to employ the peroxide at a lower concentration than that at which it is transported, the dilutability of the solution is often of some importance.

Traditionally, concentrated solutions have been formed by distilling more dilute solutions, and stabilised by the incorporation of small amounts of inorganic stabilisers and particularly pyrophosphate and/or silicates. In more recent times, the use has been suggested of organic chelating compounds, including especially certain classes of organic carboxylic acids and organic phosphonic acids. Such chelates have been successful up to a point at stabilising a range of hydrogen peroxide solutions, including concnetrated solutions, but the objective always remains to produce even more effective stabilising systems.

For many purposes, two of the most highly favoured chelating stabilisers gaining in popularity in recent years have been 1,1,1-hydroxyethylenediphosphonic acid (abbreviated herein to HEDP) and ethylene diamine tetramethylenephosphonic acid or its sodium or potassium salt thereof, abbreviated herein to EDTMP. Two other related stabilisers that have also been commercially employed likewise are nitrilo-trimethylenephosphonic acid/salts (NTMP) and diethylene triamine pentamethylenephosphonic acid/salts (DTPMP. The use of these stabilisers as the sole stabiliser or in conjunction with other compounds has been described in a large number of published patents including U.S. Pat. No. 3,122,417 (Henkel), U.S. Pat. No. 3,234,140 (Monsanto), U.S. Pat. No. 3,383,174 (FMC), U.S. Pat. No. 3,387,939 (Du Pont), U.S. Pat. No. 3,542,918 (Therachemie Chemisch Therapeutische), U.S. Pat. No. 3,701,825 (FMC), U.S. Pat. No. 3,740,187 (Monsanto, U.S. Pat. No. 3,860,391 (Benckiser-Knapsack), U.S. Pat. No. 3,865,435 (Kennecott Copper), U.S. Pat. No. 3,903,244 (FMC), U.S. Pat. No. 4,059,678 (FMC), U.S. Pat. No. 4,070,442 (Du Pont), U.S. Pat. No. 4,239,643 (Monsanto), U.S. Pat. No. 4,210,565 (Oxysynthese), U.S. Pat. No. 4,304,762 (Unilever), and U.S. Pat. No. 4,347,149, 4,497,725 and 4,525,291 (all to Interox Chemicals).

It is an objective of the instant invention to provide a stabiliser for concentrated hydrogen peroxide solutions which a more effective stabiliser under at least some conditions than the organic phosphonic acid stabilisers that have been identified hereinbefore.

The incorporation of a wide range of phosphonic acid compounds in dilute alkaline solutions of hydrogen peroxide used for bleaching cellulosic fibrous material has been suggested in a number of the foregoing specifications and in some considerable detail by Ciba-Geigy AG in EP-A-0 210 952, including a number of compounds in which aminomethylene phosphonic acid groups were dependent from a carbocyclic nucleus. However, none of the substituted carbocyclic compounds were employed in the Examples, so that the specification provides no basis for asserting that any of those compounds would have superior stabiliser properties to the compounds that were exemplified, let alone a teaching to select a non-exemplified compound for improving the stability and/or dilutability of acidic concentrated hydrogen peroxide solutions.

According to one aspect of the present invention there is provided a process for stabilising a concentrated aqueous hydrogen peroxide solution against decomposition in which the peroxygen compound is brought into contact with an effective amount of a stabiliser characterised in that the stabiliser has the general formula:

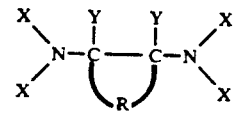

in which X represents a methylene phosphonic acid group of formula $-CH_2-(-PO_3H_2)$ or salt thereof, R represents a tetra methylene diradical, optionally alkyl-substituted, that completes a cyclo-aliphatic ring and thereby establishes the two $NX_2$ groups in a substantially fixed configuration and Y represents a hydrogen or lower alkyl group.

It will be recognised that the invention stabilisers are characterised particularly by the fact that the two nitrogen substituents are rigidly linked by virtue of the two intervening carbon atoms, normally present as CH groups, forming part of an aliphatic nucleus. Thus, rotation of the two ends of the molecule about the carbon-carbon axis cannot take place to any significant extent at the storage temperature for peroxygen compounds. Whilst, of course, rotation of each aminodimethylene phosphonic acid group about the nitrogen to nuclear carbon atom axis is still possible, as is rotation of each methylenephosphonic acid group around the nitrogen-methylene carbon axis, it will be recognised that the extent of movement of the phosphonic acid groups relative to each other is much reduced. In that way, the invention stabilisers differ from the closest commercially available stabiliser in the prior art, namely EDTMP. Accordingly, it can be theorised that any improved stabilisation demonstrated by the invention stabilisers can be attributed to restriction of the rotation of the molecule about the afore-mentioned carbon-carbon axis, but for the avoidance of doubt, it will be understood that the invention does not depend upon the accuracy of any theory or deduction as to the reason for its efficacy.

The corresponding stabilisers in which the methylene groups have been substituted by one or more lower alkyl substituents can also be employed, but their commercial attractiveness is dependant upon the location of a suitably cheap source of diamino starting material or some alternative and cheap method for their preparation. By lower alkyl is meant methyl, ethyl, propyl or butyl, including linear and non-linear isomers. Similarly, although the two carbon atoms interposed between the amino groups are normally CH groups, the hydrogen group on either or each can likewise be replaced by a lower alkyl group.

It is especially suitable to employ cyclohexane-1,2-bis aminodimethylene phosphonic acid or soluble salt thereof in which the amino groups are in the trans position relative to each other compared with the corresponding cis isomer which can be employed additionally or alternatively but less advantageously. Thus, it can be particularly convenient to employ a stabiliser in which the trans isomer predominates, in view of the availability of cyclohexane-1,2-diamine predominantly in trans form which can be readily substituted by methyl phosphonic acid groups.

The aminomethylene phosphonic acid compounds for the stabilisation of hydrogen peroxide in accordance with the present invention can be made by the methods described or employed for making such compounds as EDTMP, with appropriate variation in the amine starting materials. Such a process is described for example in U.S. Pat. No. 2,599,807 (Bersworth).

It will be understood that the instant invention is based upon the observation of decreased rate of decomposition of the hydrogen peroxide when it is brought into and maintained in contact with the invention stabiliser during extended storage periods and not upon any promise as to the chemical form of the stabiliser after prolonged storage. In view of the strong oxidising conditions in the composition, it is possible that the invention stabiliser may interact with the hydrogen peroxide in situ, with consequential change to the structure or form of the stabiliser. It would be expected that any such interaction would occur similarly to the way that the other aminophosphonic acid compounds like EDTMP or DTPMP might interact in such compositions, but self-evidently, any such change does not impair and may even enhance the ability of aminophosphonate compounds to act as a stabiliser, so that for the avoidance of doubt, the immediate results of such interactions as may occur are encompassed within the spirit of the invention.

The invention stabilisers can be employed either in acid or soluble salt form at the discretion of the user. It is in general advantageous to select material that has either no residual halide ions or only a small residual level, so as to minimise or eliminate the effect of such ions, of which chloride is the most common, which can impair the stabilising effect of the phosphonic acid stabilisers in some circumstances. Thus, it is preferable to select stabilisers that have been acidified with non-halide acids, such as sulphuric acid. In view of the relatively small amount of stabiliser employed, a salt, such as the sodium, potassium, magnesium or ammonium salt can also be used. Alternatively, the counterion can be a suitable organic cation.

In the context of the instant invention, the range of concentrated hydrogen peroxide solutions includes the grades of concentrated hydrogen peroxide that are typically sold and transported in many parts of the world, and fall within the limits of approximately 25% w/w to 85% w/w, and including specifically grades of about 100 volume, 35% w/w, 50% w/w, 65-70% w/w and 80-85% w/w. The pH of the concentrated solution normally lies in the range of from pH0 to pH 6, and in many instances is from about pH2 to 4.

The stabilised solution can be used for a very wide variety of different types of uses, after any necessary dilution and or pH adjustment. Such uses include those in strongly acidic metal-treatment solutions, acidic or alkaline solutions for metal extraction, separation or purification, use in disinfection and in alkaline solution for a range of different bleaching processes, including bleaching cotton or other textile fabrics, paper, pulp, straw, waste plant material, and domestically in household bleaching/washing operations or for keratinous material. Solutions containing the invention stabiliser are particularly suitable for use in chemical synthesis and can be used in conjunction with the known metal catalysts, for example iron to form Fenton's reagent, with continued reactivity despite the fact that such metals will be complexed by the stabiliser.

The concentration of stabiliser to employ in order for it to be effective is usually very low in comparison with the weight of peroxygen compound, but the actual amount will often take into account such factors as the extent to which the composition is already or likely in the future to be contaminated, especially with catalysts known to be able to decompose peroxygen compounds, the pH of the solution and the extent of stabilisation needed in use. In many instances, and especially in acidic conditions, the weight ratio of the peroxygen compound to stabiliser will be selected in the range of from 140:1 to 70000:1. It is often expressed alternatively in terms of simply the amount of stabiliser in the peroxygen composition, and this normally is at least 10 ppm w/w, and generally is not more than 5000 ppm, irrespective of the peroxygen compound concentration. The actual amount typically employed varies between different purposes for the composition. Thus, for example, electronic grade solutions which tend to employ the purest ingredients normally contain 10 to 50 ppm of the stabiliser, grades of solution intended for chemical syntheses, such as epoxidations and controlled organic oxidations often contain from 50 to 1000 ppm of the stabiliser, solutions intended for treating contact lenses typically contain the stabiliser in the region of 1000 ppm and solutions intended for the treatment of metals, such as metal pickling or polishing solutions often contain high concentrations of stabiliser of 1000 to 5000 ppm to counteract high concentrations of transition metal catalysts which such solutions eventually contain.

It will be understood that the invention stabilisers can be substituted for previously available phosphonic acid stabilisers such as HEDP or EDTMP in substantially the same amounts as have been described for the use of those prior stabilisers.

Although the invention stabiliser can be employed, if desired, as the sole stabiliser, it can also be employed advantageously in combination with the classes of other materials that have been described hitherto as stabilisers for hydrogen peroxide. Advantageously, under certain conditions, and typically expressed in general terms when the phosphonate stabiliser represents the major weight fraction, synergism between the stabilisers is apparent. One such class of co-stabilisers comprises organic acids containing two or more functional groups. These groups can be carboxylic acid groups or alternatively one or more of them can be an hydroxyl, or amino group. Examples of that type of co-stabiliser include citric acid and related acids like gluconic acid, and aromatic compounds like salicyclic acid, p-hydroxybenzoic acid, and anthranilic acid.

A further class of co-stabiliser comprises phosphates, by which term is meant not only phosphoric acid itself and salts thereof, but also the various condensed phosphate species including especially tetrapyrophosphates and hexametaphosphates.

The aforementioned co-stabilisers often demonstrate synergy when employed in an amount of up to about 1 part per part by weight of the invention stabilisers, such as in the range of 1:10 to 1:1 parts co-stabiliser.

Additionally, the invention stabilisers can be employed with other well-known conventional stabilisers such as soluble silicates, and in particular magnesium silicates, stannates and particularly sodium stannate and the heretofore commercialised phosphonate stabilisers like HEDP, EDTMP, NTMP, DTPMP and the corresponding amino-carboxylic acid stabilisers like EDTA and DTPA. The amounts of such additional stabilisers can be used at the discretion of the formulator, but often are individually selected in the range of 0.1 to 10 parts w/w of the invention phosphonate stabiliser.

Advantageously, it has been found that a particularly effective combination of stabilisers that is well suited to dilution with municipal water supplies comprises the CDTMP plus sodium stannate, preferably selected in concentrations of respectively 10 to 500 mg/l and 0.5 to 10 mg/l (calculated as Sn).

Additionally, the invention stabiliser solution can also include an agent such as nitric acid or soluble salt thereof which can passivate certain metal surfaces such as aluminium which has been a favoured material in which to store aqueous hydrogen peroxide solutions. Typically, nitrate can be employed in a weight ratio of up to twice the weight of the invention stabiliser whilst retaining or even augmenting the stability of hydrogen peroxide Having described the invention in general terms, specific embodiments will be given hereinafter in greater detail by way of example only.

EXAMPLE 1 AND COMPARISON C2

In this Example the effectiveness at stabilisation is demonstrated by introduction of an aminocompound , CDTMP having the formula:

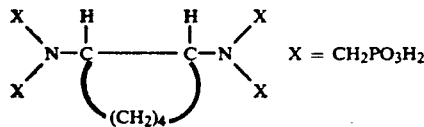

compared with HEDP in the comparison.

The test is carried out by dilution of unstabilised distilled 85% w/w hydrogen peroxide to 70% w/w with deionised water, introducing into the aqueous acidic solution the respective stabiliser compound to a concentration of 1000 mg/kg and further diluting the solution to 35% w/w concentration. Duplicate samples, each of 25 mls of the 35% w/w solution were then doped with a mixture of transition metal compounds known to be able to catalyse decomposition of the hydrogen peroxide, namely iron to a concentration of $3.45 \times 10^{-3}$ g $Fe^{3+}$/liter and copper to a concentration of $7.85 \times 10^{-4}$ g $Cu^{2+}$/liter. The samples were then held for 3 hours at 40° C. and the volume of gas generated was measured by a water displacement method at ambient pressure (plus the very small extra pressure resulting from the few centimeters head of displaced water.) It was found that under the conditions of this test, the mean rate of gassing in Example 1 was only $6.0 \times 10^{31\ 3}$ ml/min compared with a mean gassing rate from the comparison HEDP of $23.2 \times 10^{-3}$ mls/min under the same test conditions. This shows that the invention stabiliser was markedly more effective than HEDP. When the same weight of EDTMP (ethylene diamine tetramethylene phosphonate), a comparison stabiliser, was substituted for CDTMP in this test, its mean gassing rate was $8.0 \times 10^{-3}$ ml/min which is significantly worse than the results for CDTMP.

EXAMPLE 3 AND COMPARISON 4

In this Example, the effectiveness at peroxidic stabilisation by introction of CDTMP is demonstrated under the following conditions which simulate the effect of on-site dilution of concentrated hydrogen peroxide that has been transported and which typically uses a local water supply that contains metal contaminants.

A solution of 70% w/w hydrogen peroxide solution containing 1000 mg/liter of the stabiliser was prepared in the same way as for Example 1, and was then stored at ambient temperature that was about 20° to 25° C. during the day. Periodically, three samples, each of 25 mls, were prepared by diluting extracts to 35% w/w concentration with deionised water and introducing a mixture of decomposition catalysts to concentrations of respectively:

$1.2 \times 10^{-4}$ g/liter $Al^{3+}$
$1.2 \times 10^{-4}$ g/liter $Fe^{3+}$
$2.4 \times 10^{-5}$ g/liter $Cu^{2+}$
$1.2 \times 10^{-5}$ g/liter $Mn^{2+}$
$6.0 \times 10^{-6}$ g/liter $Cr^{6+}$ The samples were then heated to 100° C. for three hours in glass reaction tubes and the amount of gas evolved was measured The effectiveness of the stabiliser for long term storage was determined by observing what change there was in the extent of gas evolution after increasing periods of storage of the 70% w/w solution.

The mean rate of gas evolution from the 25 ml samples was 0.033 ml/min on the day when the stabiliser was introduced into the 70% w/w solution, and after respectively 2 months, 4 months and 5 months storage, the mean rates were 0.034, 0.039, and 0.049 ml/min.

By way of comparison, in comparison C4, exactly the same test was carried out using the same weight of HEDP instead of CDTMP and the mean gassing rates were respectively 0.021 ml/min on the day when the 70% w/w solution was produced, and 0.047 ml/min after 2 months storage.

From the figures for Example 3, it can be seen that CDTMP is not only a very good stabiliser upon introduction into a peroxygen composition, but also that it retains its stabilising properties very well during storage for extended periods. It can consequently be deduced that even if CDTMP is in some way interacting in solution with the other components, the resultant product also demonstrates stabilising properties.

By comparing the results obtained for Example 3 with those for comparison 4, it will observed that the invention stabiliser was more effective expressed on a weight/weight basis for long term storage, and more so if expressed on the basis of stabilisation conferred per unit weight of phosphonic acid group, since the proportion of phosphonic acid in HEDP is greater than in CDTMP.

EXAMPLE 5

In this Example, diluted solutions of hydrogen peroxide (3% w/w), approx, in biologically pure water, i.e. suitable for use in sterilising contact lenses, were stabilised by introduction of CDTMP at a concentration of from 50 to 1000 ppm. Some of the CDTMP products had been rendered acid with sulphuric acid and some with hydrochloric acid. The samples of solution were stored at ambient temperature in small stoppered polyethylene bottles that would permit the gas pressure to equalise with the external atmospheric pressure. The solutions were periodically tested for residual available oxygen by the standard test using potassium iodide and potassium permanganate. After 9 weeks, within the limits of error of the testing procedure, there was no apparent loss of active oxygen from any of the samples, and indeed on average they showed an apparent gain of about 1% available oxygen, a finding that is consistent with minimal water loss by evaporation on storage. This test shows not only how effective CDTMP is as a stabiliser, but also that the stabiliser is somewhat tolerant to the presence of chloride ions, which have been implicated in peroxidic decomposition is some conditions.

EXAMPLE 6

In this Example, CDTMP stabiliser was introduced into 35% w/w aqueous hydrogen peroxide solutions at a concentration of from 20 to 1000 ppm. Intermediate concentrations were 50, 100, 200 and 500 ppm. The solutions were stored at 32° C. in the polyethylene bottles, at a pH of approximately 3, and periodically tested for residual available oxygen content by the standard $KI/KMnO_4$ method. After 7 weeks storage, the solutions had fallen by about 0.1% available oxygen in 35%, i.e 0.3%, except for the sample containing the least amount of CDTMP 20 ppm, which showed no apparant loss of available oxygen concentration. This example demonstrates that even very low concentrations of stabiliser, 6 parts per 100,000 parts w/w of hydrogen peroxide was effective at stabilisation at this pH.

EXAMPLE 7

In this Example, the procedure of Example 3 was repeated, but substituting the same weight of CDTMP that had been made in the presence of sulphuric acid and was thus essentially chloride-free in place of CDTMP that contained residual low level of chloride. It was found that the gassing rate was only 0.021 ml/min for the 25 ml sample, measured on the day that the stabiliser was introduced into the concentrated hydrogen peroxide solution. This indicates that this product was even more effective as a stabiliser than the chloride-containing product.

EXAMPLE 8

In this Example, the procedure of Example 1 was followed, but employing instead of 1000 ppm of stabiliser respectively 500 ppm of CDTMP in 8a, 500 ppm of CDTMP plus 100 ppm of citric acid in 8b, and 300 ppm of CDTMP plus 300 ppm of citric acid in 8c. It was found that relative to 8a, the rate of gassing in 8b was reduced by a factor of 1.3 and that in 8c was reduced by a factor of 2.2. This demonstrates clearly that citric acid in such proportions was cooperating, probably synergistically, with CDTMP.

Example 9

In this Example, the procedure of Example 1 was followed, but employing instead of 1000 ppm of stabiliser respectively 500 ppm of CDTMP in 9a, 500 ppm of CDTMP plus 100 ppm of p-hydroxybenzoic acid (PHBA) in 9b, and 400 ppm of CDTMP plus 200 ppm of PHBA in 9c. It was found that relative to 9a, the rate of gassing in 9b was reduced by a factor of 2.0 and that in 9c was reduced by a factor of 1.3. This demonstrates clearly that p-hydroxybenzoic acid in such proportions was cooperating, probably synergistically, with CDTMP.

EXAMPLE 10

In this Example, the procedure of Example 1 was followed, but employing instead of 1000 ppm of stabiliser respectively 500 ppm of CDTMP in 10a, 500 ppm of CDTMP plus 100 ppm of sodium pyrophosphate in 10b, and 300 ppm of CDTMP plus 300 ppm of sodium pyrophosphate in 10c. It was found that relative to 10a, the rate of gassing in 10b was reduced by a factor of 1.6 and that in 11c was reduced by a factor of 1.3. This demonstrates clearly that sodium pyrophosphate in such proportions was cooperating, probably synergistically, with CDTMP.

EXAMPLES 11

In this Example, the procedure of Example 1 was followed, but employing instead of 1000 ppm of stabiliser respectively 500 ppm of CDTMP in 11a, 500 ppm of CDTMP plus 100 ppm of phosphoric acid in 11b, and 300 ppm of CDTMP plus 300 ppm of phosphoric acid in 11c. It was found that relative to 11a, the rate of gassing in 11b was reduced by a factor of 2.7 and that in 11c was reduced by a factor of 1.8. This demonstrates clearly that phosphoric acid in such proportions was cooperating, probably synergistically, with CDTMP.

EXAMPLE 12

In this Example, the procedure of Example 1 was followed, but employing instead of 1000 ppm of stabiliser respectively 500 ppm of CDTMP in 12a, 500 ppm of CDTMP plus 100 ppm of sodium nitrate in 12b, and 300 ppm of CDTMP plus 300 ppm of sodium nitrate in 12c. It was found that relative to 12a, the rate of gassing in 12b was reduced by a factor of 1.6 and that in 12c was reduced by a factor of 1.3. This demonstrates clearly that nitric acid though not a stabiliser in its own right in such proportions was cooperating, probably synergistically, with CDTMP.

EXAMPLE 13

In this Example, the effectiveness of the invention stabiliser systems at reducing peroxide decomposition on its dilution with municipal water is demonstrated. In each trial, aqueous hydrogen peroxide, 35% w/w, and containing the amounts of stabilisers specified, is diluted to a concentration of 6% with the municipal water supply of Luton, England and its pH is adjusted to pH2.5. The stability of the resultant solution was determined by heating 25 ml samples (in triplicate) to 100° C. and measuring the volume of gas evolved by decomposition of the peroxide. The average cumulative amount after 3 hours of the three samples is given below. Trial 13a which was not according to the invention is given for comparison only. In the Table, the weight of CDTMP given is that of the active ingredient, introduced in the form of a 30% w/w aqueous solution, the weight of sodium pyrophosphate is calculated as $PO_4$ and the weight of sodium stannate is calculated as Sn.

THE TABLE

| Trial No | Stabiliser System - mg/l of | | | Gas evolved mls |
|---|---|---|---|---|
| | CDTMP | phosphate | stannate | |
| 13a | — | 170 | 60 | 4.7 |
| 13b | 900 | 170 | — | 1.2 |
| 13c | 228 | 170 | — | 2.7 |
| 13d | 30 | 170 | 5 | 1.4 |

From the Table, it can be seen that it is possible to produce a dilution grade of hydrogen peroxide that omits or substantially reduces the concentration of stannate, whilst maintaining or improving the stability of the product after dilution. It can also be seen by comparing trials 13b, 13c and 13d that the addition of only 5 mg/l stannate enables a similar extent of stabilisation to be attained using only a thirtieth of the amount of CDTMP in trial 13b, thereby demonstrating synergistic cooperation between the components of the stabiliser system in 13d.

We claim:

1. In a process for stabilising a concentrated aqueous acidic hydrogen peroxide solution containing at least 25% by weight of hydrogen peroxide against decomposition in which the hydrogen peroxide is brought into contact with an effective amount of a stabiliser, the improvement in which the stabiliser has the general formula:

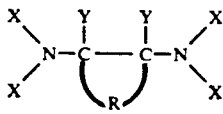

in which X represents a methylene phosphonic acid group of formula $-CH_2-(-PO_3H_2)$ or salt thereof, R represents a tetra methylene diradical, optionally alkyl-substituted, that completes a cyclo-aliphatic ring and thereby establishes the two $NX_2$ groups in a substantially fixed configuration and Y represents a hydrogen or lower alkyl group.

2. A process according to claim 1 in which the stabiliser is cyclohexane-1,2-diaminotetramethylene phosphonic acid.

3. A process according to claim 1 or 2 in which the stabiliser is introduced into aqueous acidic solution containing hydrogen peroxide in a weight ratio of stabiliser to hydrogen peroxide of from 1:140 to 1:70000.

4. A process according to claim 1 in which the stabiliser is employed in conjunction with a co-stabiliser selected from the group consisting of organic acids containing a carboxylic or sulfonic acid group and containing a further functional group selected from the group consisting of carboxylic acid, sulfonic acid, hydroxyl and amino groups.

5. A process according to claim 4 in which the co-stabiliser comprises an aliphatic or aromatic hydroxycarboxylic acid.

6. A process according to claim 5 in which the co-stabiliser is citric acid or p-hydroxybenzoic acid.

7. A process according to claim 1 in which the stabiliser is employed in conjunction with a phosphate co-stabiliser.

8. A process according to claim 4 in which the co-stabiliser is employed in a weight ratio to the stabiliser of up to about 1:1.

9. A process according to claim 1 in which the stabiliser is employed in conjunction with a stannate co-stabiliser or a nitrate capable of passivating an aluminum surface, or both.

10. A concentrated aqueous acidic solution of hydrogen peroxide containing at least 25% by weight of hydrogen peroxide and stabilised by an effective amount of a compound of formula:

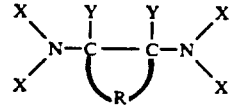

in which X represents a methylene phosphonic acid group of formula $-CH_2-(-PO_3H_2)$ or salt thereof, R represents a tetra methylene diradical, optionally alkyl-substituted, that completes a cyclo-aliphatic ring and thereby establishes the two $NX_2$ groups in a substantially fixed configuration and Y represents a hydrogen or lower alkyl group.

* * * * *